March 27, 1962 R. C. DU BOIS 3,026,611
METHOD OF MAKING A PRESSURE GUARD OF THE
DIAPHRAGM CAPSULE TYPE
Filed June 21, 1957 2 Sheets-Sheet 1

Inventor
Robert C. Du Bois

March 27, 1962  R. C. DU BOIS  3,026,611
METHOD OF MAKING A PRESSURE GUARD OF THE
DIAPHRAGM CAPSULE TYPE
Filed June 21, 1957  2 Sheets-Sheet 2

Inventor
Robert C. Du Bois
by Roberts Cushman & Grover
Attys

United States Patent Office 3,026,611
Patented Mar. 27, 1962

3,026,611
METHOD OF MAKING A PRESSURE GUARD OF THE DIAPHRAGM CAPSULE TYPE
Robert C. Du Bois, Fairfield, Conn., assignor to Manning, Maxwell & Moore, Incorporated, Stratford, Conn., a corporation of New Jersey
Filed June 21, 1957, Ser. No. 667,083
3 Claims. (Cl. 29—454)

This invention pertains to pressure responsive instruments, for example pressure gauges or recording devices, and more especially to a guard for installation between the instrument and the source of high temperature pressure fluid and to a method of making such a guard.

Guard devices of this kind commonly comprise a flexible diaphragm forming one wall of a chamber containing a body of fluid by means of which pressure fluctuations, acting on the outside of the diaphragm, are transmitted to the instrument. However, since the volume of the body of fluid which thus transmits pressure fluctuations to the instrument is subject to substantial variation in response to temperature change, the indications of the instrument may be erroneous at times—the error being increasingly evident in proportion to the quantity of the fluid involved.

One object of the present invention is to provide a guard device, including a pressure sensitive diaphragm as an element, so devised that the volume of pressure-transmitting fluid is very small as compared with usual prior practice thereby to minimize temperature errors in the instrument.

A further object is to provide a guard of this kind wherein the diaphragm means is unusually flexible and is thus very responsive to pressure changes but is still capable of withstanding high pressures without rupture or permanent distortion.

In the manufacture of devices of this type, particularly those which are to be used in high pressure equipment, it is necessary to use the greatest care in uniting the constituent parts of the guard device to avoid leakage or separation at any pressure to which the device may be subjected during use. The only really satisfactory mode of connecting such parts is by welding. However, in accordance with customary prior practice in assembling and uniting the parts of such a guard device, it has not been practical to test each individual weld, as formed, to determine whether it was leak-tight, and customarily, test for leakage has been deferred until the device was substantially complete and, as a result, a considerable percentage of such devices (otherwise complete) must be scrapped because they do not meet the required leakage test. A contributing factor to such high percentage of loss is the difficulty experienced in forming perfect welds between the parts as they are customarily designed. Some of these parts are thin and delicate and of a material which must have certain predetermined characteristics, and such parts, except by the employment of chills, cannot be welded without distortion, or injury to the character of the metal. A further object of the present invention is to provide a guard device having its constituent parts so designed as to facilitate the use of the requisite chills or other tools in welding them together and to provide a novel method of assembling and welding such parts whereby warpage or degrading of the metal is avoided and partial assemblies may be tested from time to time as the operation proceeds, thus greatly reducing loss from scrapping and insuring a completed device which is rugged and capable of withstanding severe use without leakage although at the same time, being very sensitive to pressure fluctuations and having a low-coefficient of thermal expansion.

Other and further objects and advantages of the invention will be pointed out in the following and more detailed description and by reference to the accompanying drawings wherein.

Figure 5:
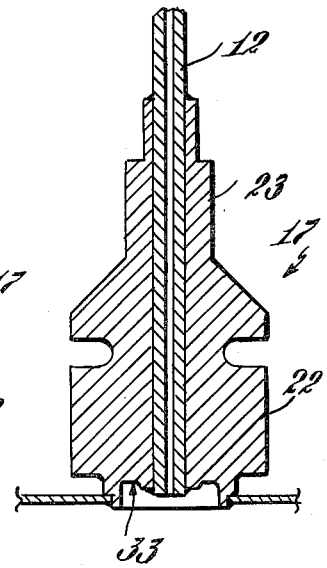
FIG. 5 is a view generally similar to FIG. 4, but after the following step in the operation whereby the upper diaphragm element is welded to the bushing of FIG. 3.
Figure 6:
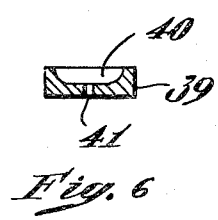
FIG. 6 is a diagrammatic section through a filler piece which forms an element of the completed structure.
Figure 7:
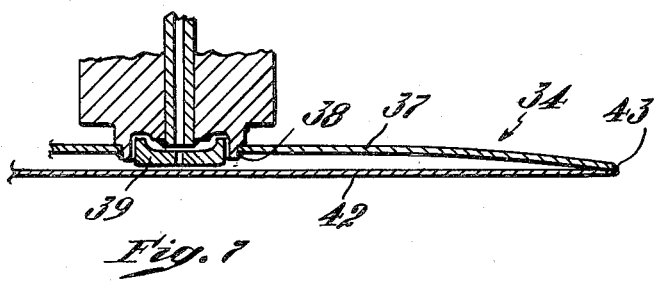
Figure 8:
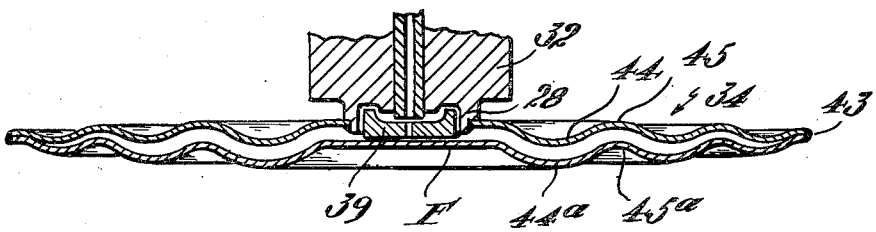

FIG. 7 is a fragmentary vertical section similar to FIG. 5, but showing the filler piece and the lower diaphragm element assembled with the other parts; and, FIG. 8 is a view generally similar to FIG. 5, but showing the result of the forming operation whereby the upper and lower diaphragm plates are provided with concentric ribs and are caused accurately to match each other in complementary contours.

Figure 1:
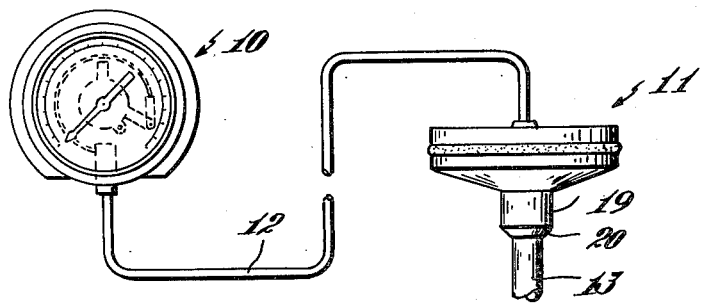
FIG. 1 is a side elevation of a gauge assembly showing a pressure gauge of generally conventional type connected by a capillary tube to a guard device embodying the present invention.

FIG. 1 of the drawings shows an assembly comprising a pressure responsive instrument 10, for example a pressure gauge, a protective device 11 in accordance with the present invention and a capillary tube 12 connecting the instrument 10 with the protective device 11—the latter being connected to a conduit 13 which may extend to the source (not shown) of pressure fluid.

Figure 2:
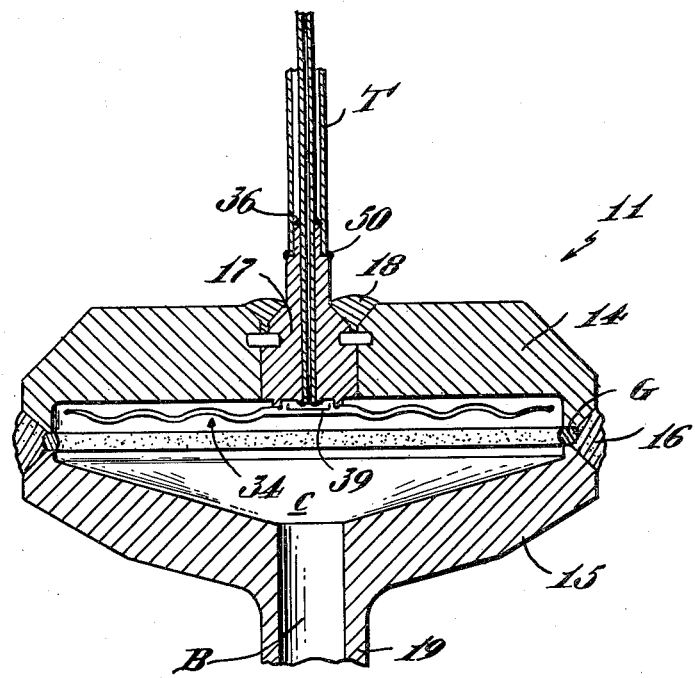
FIG. 2 is a fragmentary vertical, diagrammatic section, to larger scale, through the guard device of the present invention showing it in completed form.
Figure 3:
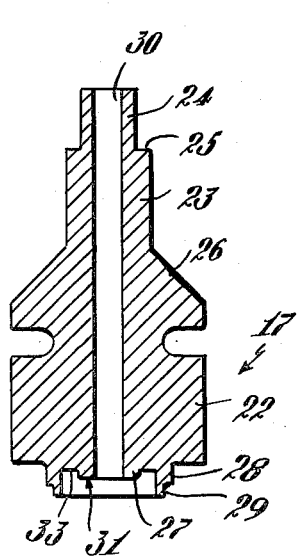
FIG. 3 is a vertical section in the same plane as FIG. 2, but to larger scale, showing a bushing forming an element of the device of the present invention.
Figure 4:
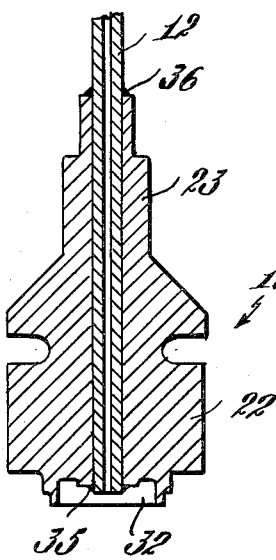
FIG. 4 is a view similar to FIG. 3 showing the same bushing but with the capillary tube assembled therewith and welded thereto.

Referring to FIG. 2 of the drawings, the protective device 11 is shown as having a housing comprising the upper and lower rigid members 14 and 15 which may, for example, be metal castings and which are so shaped that, when assembled, they provide between them a chamber C for the reception of the diaphragm capsule hereafter described. The casing members 14 and 15 are preferably of circular form and are provided at their peripheral edges with bevelled surfaces which collectively provide a V-shaped channel for the reception of welding metal 16 whereby the housing members 14 and 15 are permanently joined leak-tight to each other. For convenience, but not necessarily, a light preliminary weld is formed at G sufficient to hold the parts in properly assembled relation while the relatively heavy weld at 16 is being formed.

The upper housing member 14 is provided with an axial bore and the lower part 15 is desirably provided with an integral boss or stem portion 19 having a bore B extending into the chamber C. This bore B communicates with the conduit 13, the latter being secured leak-tight to the part 19 by welding as indicated at 20. Referring to FIG. 2, the numeral 17 designates a rigid part, here referred to as a "bushing," which is fitted within the central bore in the housing member 14 and which is secured leak-tight to the top member 14 of the housing by welding metal indicated at 18.

Referring to FIGS. 3 to 7, the bushing 17 comprises a cylindrical body portion 22 which fits snugly in the bore in the part 14 and which, if desired, may have screw-threaded engagement with the part 14. The bushing has a neck portion 23 of smaller diameter than the body portion 22 and beyond the neck portion 23, the bushing is provided with the cylindrical nipple portion 24 which joins the part 23 at a radial shoulder 25. The bushing is provided with an axial bore 30 designed to receive the capillary tube 12 with a snug fit. The inner end of the bushing (that is to say, the end of the bushing which is exposed within the chamber C in the housing), is provided with concentric annular ribs 27 and 28, respectively, the rib 28 having a peripheral recess 29 at its outer end. The inner rib 27 is provided with a flat end surface 31. The interior of the outer rib 28 defines a shallow chamber 32—the end surface 31 of the rib 27 being in a plane slightly below the upper wall 33 of this chamber.

In assembling the parts, the capillary tube 12 is pushed downwardly through the bore 30 in the bushing until its lower end projects slightly beyond the end surface 31 of the rib 27. The projecting end of the capillary tube is now welded at 35 to the rib 27 and, preferably, the capillary tube is also welded at 36 to the bushing at the upper end of the nipple portion 24, thus providing a leak-tight union of the capillary tube to the bushing so that pressure fluid cannot pass between the capillary tube and the wall of the bore in the bushing. By reason of the exposed locations of the welds 35 and 36, they may be made without difficulty and without substantial danger of distorting the parts.

The diaphragm capsule 34, FIGS. 2, 7 and 8, comprises the upper disc 37 of very thin, resilient metal, this disc having a central aperture of a size to receive the lower end of rib 28 of the bushing. In assembling the parts, the central aperture of the disc 37 is fitted over the end of the rib 28 so that the margin of the aperture rests against the shoulder provided by the recess 29 and then, after applying suitable chills to the marginal portion of the disc 37, the weld 38 (FIG. 7) is formed. After making the welds 35 and 38, the parts may be tested for leakage.

Desirably, a filler member 39 is provided to reduce the effective size of the chamber 32 which is formed in the end of the bushing to facilitate the formation of welds 35 and 38. This filler member 39 may be of any suitable material, but preferably has a low co-efficient of expansion. It is hollowed out at its upper part for the reception of the projecting lower end of the capillary tube 12, and has a central passage 41 which aligns with the passage in the capillary tube. The external diameter of the part 39 is such that it is received with a loose fit in the chamber 32 at the lower end of the bushing.

The diaphragm capsule also comprises a bottom disc 42 which is desirably of approximately the same diameter and of the same material as the disc 37. After the weld 38 has been tested, the filler 39 is placed in the chamber 32 and the disc 42 is assembled with the disc 37 so that their edges are in registry and their edges are then permanently united by a weld 43, using two chills to protect the discs from heat injury. After the parts above described have thus been assembled, a protective or armor tube T (FIG. 2) is slipped over the capillary tube and its lower end is welded to the bushing at the shoulder 25 as shown at 50 (FIG. 2). The entire assembly may now be tested again for leakage at the welds 36, 50 and 43. After the assembly, comprising the bushing 17, the filler 39 and the discs 37 and 42, has been completed, the discs are subjected to a forming operation, for example, by interposing them between suitably shaped, rigid dies and subjected to pressure whereby the upper disc 37 is provided with corrugations and the lower disc is similarly provided with matching corrugations, the hollows or troughs 44 of the upper disc being registered with the hollows or troughs 44ᵃ of the lower disc and the crests 45 of the corrugations of the upper disc registering with crests 45ᵃ of the lower disc. While as here shown, the corrugations are circular and concentric, other shapes and arrangements of corrugation may be employed, providing that those of the two plates or discs match, so that the ribs of one plate can nest in the hollows of the other plate. As shown in the FIG. 8, the central part F of the lower disc 42 is so shaped as to minimize the space between it and the filler 39 and weld 38. By thus corrugating or crinkling the discs after assembly, their surfaces may be brought into very close adjacency so that the space between them, which in use is filled with a liquid, is of very small volume, the space for liquid being further reduced by the presence of the filler member 39. In FIG. 8, the spacing of the discs 44 and 44ᵃ is much exaggerated merely to facilitate illustration of the several parts of the device. With this arrangement, the entire volume of liquid which is contained within the diaphragm capsule and in the bore in the capillary tube may be so small that fluctuations in temperature will not substantially affect the reading of the instrument 10.

It will be understood that the assembly comprising the bushing, the capillary tube, filler and diaphragm capsule will be made up and tested before it is assembled with the housing 11. Having assembled the parts comprising the bushings, the capillary tube, the filler 39 and the diaphragm capsule, the bushing is pushed up into the bore in the upper housing member 14 and the weld 18 (FIG. 2) is formed and tested, it being noted that this latter weld unites relatively heavy parts which are not readily subjected to distortion at the welding temperature. The lower member 15 of the housing is now assembled with the part 14 and the weld 16 formed and tested. This weld also unites relatively heavy parts.

The end of the capillary tube 12 is welded to the stem of the instrument 10 and the armor tube T may likewise be welded to the stem of the instrument 10, thus completing the assembly.

Although the capsule, comprising the united discs or plates 44 and 44ᵃ has here been shown and described as an element of a guard assembly of specific construction, it is contemplated that this capsule and the described method of making it may be found useful in other environments.

While one desirable embodiments of the invention has been herein disclosed and described by way of example and desirable mode of assembly of its several parts, it is to be understood that the invention is broadly inclusive of any and all modifications falling within the scope of the appended claims.

I claim:

1. That method of making a guard for installation between a source of variable fluid pressure and an instrument which is responsive to such variations, said method comprising as steps providing a rigid bushing having an axial bore, installing a capillary tube within the bore in the bushing so that one end of the tube projects slightly beyond that surface of the bushing which is at the end of the bore, welding said end of the tube to the bushing, providing two diaphragm discs of thin, resilient metal and of substantially the same thickness and diameter, one of said discs having a central aperture, assembling the latter disc with the bushing so that the central aperture of the disc is concentric with the capillary tube, applying chills to the material of the disc, bordering said opening, while welding the inner edge of the disc, testing the weld so formed, assembling the other disc with the apertured disc so that their outer edges are in registry, applying chills to the outer marginal portions of the two discs while welding their outer edges together thereby to form a diaphragm capsule, testing the last named weld and subjecting the united discs to pressure between appropriate dies thereby to provide the discs with matching corrugations with the troughs of the corrugations of one disc registering with the crests of the corrugations of the other disc.

2. The method, according to claim 1, further characterized in welding the capillary tube to the bushing where the tube emerges from the latter, providing a tubular metallic shield for the capillary tube, so as to embrace the last named weld, and welding the end of the shield to the bushing.

3. The method, according to claim 1, further characterized in providing a rigid housing comprising two complemental parts so shaped that when assembled they define a chamber for the reception of the diaphragm capsule, and of such dimensions that when the capsule is disposed within said chamber the major portion of the outer surface of each disc is free from contact with the wall of the chamber, one of said housing parts having a bore for the reception of the bushing and the other of said housing parts having a passage for the entrance of pressure fluid, inserting the bushing in the bore of the first of said housing parts, forming a weld at the exterior of said latter housing part, uniting the bushing to said part, testing said weld, assembling the second housing part with the first, thereby enclosing the diaphragm capsule, forming a weld at the exterior of said housing parts, thereby uniting said parts to each other, and testing said latter weld.

References Cited in the file of this patent

UNITED STATES PATENTS

| | | |
|---|---|---|
| 1,775,532 | Le Boeuf | Sept. 9, 1930 |
| 2,071,583 | Schutt | Feb. 23, 1937 |
| 2,331,464 | Fillo | Oct. 12, 1943 |
| 2,392,943 | Persons | Jan. 15, 1946 |
| 2,450,120 | Cate | Sept. 28, 1948 |
| 2,534,123 | Hasselhorn | Dec. 12, 1950 |
| 2,632,475 | Elo | Mar. 24, 1953 |
| 2,729,243 | Senn | Jan. 3, 1956 |
| 2,760,260 | Melchior | Aug. 28, 1956 |
| 2,770,258 | Bowditch | Nov. 13, 1956 |
| 2,770,932 | Polye | Nov. 20, 1956 |

FOREIGN PATENTS

| | | |
|---|---|---|
| 481,416 | Germany | Aug. 21, 1929 |
| 521,273 | Great Britain | May 16, 1940 |